United States Patent
Dowse

[11] 3,986,228
[45] Oct. 19, 1976

[54] GROMMET

[75] Inventor: Robert S. Dowse, Highland Park, Calif.

[73] Assignee: Lockheed Aircraft Corporation, Burbank, Calif.

[22] Filed: Apr. 5, 1973

[21] Appl. No.: 348,235

[52] U.S. Cl. .................................. 16/2; 248/56; 174/153 G
[51] Int. Cl.² .......................................... B65D 7/48
[58] Field of Search ............... 16/2; 248/56; 174/81, 174/65 G, 152 G, 153 G

[56] References Cited
UNITED STATES PATENTS

| | | | |
|---|---|---|---|
| 1,822,260 | 9/1931 | Adams | 16/2 X |
| 2,573,600 | 10/1951 | Pruehs | 16/2 X |
| 2,633,483 | 3/1953 | Hafke | 174/153 G |
| 3,141,251 | 7/1964 | Olson et al. | 174/153 G |
| 3,151,905 | 10/1964 | Reuther et al. | 174/153 G |
| 3,502,917 | 3/1970 | Bizoe | 174/153 G X |

FOREIGN PATENTS OR APPLICATIONS

| | | | |
|---|---|---|---|
| 867,503 | 3/1971 | Canada | 248/56 |
| 1,540,461 | 9/1969 | Germany | 174/153 G |
| 1,081,615 | 8/1967 | United Kingdom | 16/2 |

Primary Examiner—Roy D. Frazier
Assistant Examiner—Peter A. Aschenbrenner
Attorney, Agent, or Firm—Billy G. Corber; Ralph M. Flygare

[57] ABSTRACT

A one-piece molded grommet for routing a cable inserted therethrough and to protect the cable from bending, cutting and foot traffic. A cavernous tab or foot in the form of a split sleeve portion disposed in a first plane is attached to a vertically oriented barrel portion through which an inserted cable is elevated from the cavity of the tab to a second plane generally parallel to the first. A flange member or pad is attached to the barrel portion at the second plane and includes a bore at an angle to the cable's introduction to the cavernous tab. A vertically oriented slit is provided in the barrel and the flange member to facilitate installation and removal of the cable to the grommet. The slit is off-center relative to the bore in order to provide a saddle of protective material for the cable therein should pressure be applied to the top of the grommet. A shoulder is also included for the flange member and barrel to stabilize the position of the grommet in its retention to a channel member as it takes to heel pressure or the like.

2 Claims, 6 Drawing Figures

GROMMET

BACKGROUND OF THE INVENTION

1. Field of the Invention

The field of art to which the invention is most likely to pertain is located in a class of devices generally relating to grommets. Class 16, Misc. Hardware, U.S. Patent Office Classification, may be the applicable general area of art in which the claimed subject matter of the type involved here may be classified.

2. The Prior Art

Examples of prior art devices in the arts to which this invention most likely pertains are U.S. Letters Pat. Nos. 986,213; 1,284,291; 1,600,890; 2,441,321; 2,249,593; 2,258,745; 2,900,435; 3,117,371; 3,328,513; 3,389,212 and 3,428,742.

PROBLEMS IN THE PRIOR ART

Although a carpet is installed upon the floor of an aircraft passenger cabin and over various wiring cables, such cables ultimately emerge from the carpet in the passenger seat areas to extend to electronic devices mounted in the seat assemblies to control various passenger conveniences such as stereo headsets and the like. The exposure of these cables subjects them to foot or heel pressure, food cart traffic, etc., with the result of failures and shorts in the cables and subsequent loss of the utility of such conveniences. These failures and shorts are also difficult to locate. Furthermore, these cables must be expeditiously routed to such controlling devices which are in proximity to the seat assemblies securely mounted upon the cabin floor. The wiring cables must be routed around the seat assemblies rather than arranging the seat assemblies around the cable routings.

This invention provides a solution for these problems.

SUMMARY OF THE INVENTION

This invention generally relates to antiabrasive devices, and is particularly related to a grommet for utilization in a channel or other conduit in which a cable extending therein is to be retained until otherwise routed. This grommet protects a cable by maintaining it in a channel to a point at which the cable departs from its channel to be oriented otherwise than as its introduction into the grommet situated in the channel.

An object of this invention is to prevent bending or cutting of a cable upon its projection or emergence from a channel, conduit or the like in which it is laid.

Another object of this invention is to prevent damage to or functional failure of a cable during entry or egress from a channel, conduit, groove or the like.

Another object of this invention is to positively position a cable passing through the grommet and emerging therefrom at an angle in any plane to the line of introduction of the channelled cable to the grommet.

Another object of this invention is to fasten a cable to a channel member in order to prevent the cable from otherwise being pulled out of the channel member.

A further object of this invention is to stabilize the positioning of a cable in its channel or conduit under pressure of traffic thereover.

A further object of the invention is to protect a cable against pressure, such as foot or heel pressure applied to the top of the grommet, thereby preventing abrasion, cutting, or bending to the cable.

Another object of this invention is to localize corrosion in a channel member to which the grommet is to be adapted.

Another object of the invention is to provide easy removability and replacement of a grommet to a cable.

These and other objects of the invention will become more apparent upon a full and complete reading of the following description, the appended claims thereto, and the accompanying drawing comprising one sheet.

DESCRIPTION OF THE PREFERRED EMBODIMENT

Figure 5:
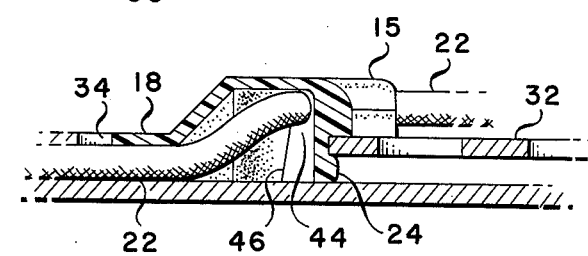
FIG. 5 is a view taken on line 5—5 of FIG. 3.
Figure 6:
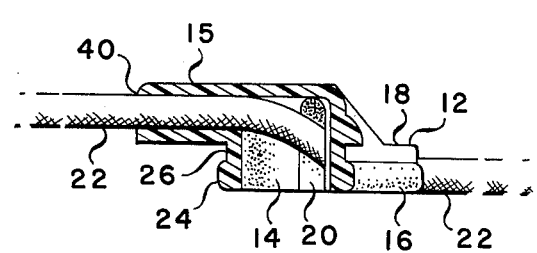
FIG. 6 is a view taken on line 6—6 of FIG. 3.

Referring now to the drawing in which reference characters correspond to like numerals hereinafter, reference character 10 generally designates the subject matter of this invention. A grommet 10 is formed as one piece, in a molded construction and from a medium hard plastic composition such as polyvinyl chloride. The plastic should be slightly flexible but stiff enough not to roll. The grommet 10 comprises a split sleeve portion or cavernous tab or foot 12 attached to a generally hollow circular portion or barrel 14 (FIG. 6) which preferably extends normally or vertically in relation to a plane generally containing the tab 12, and a bored flange member or pad 15 mounted to the barrel 14 in a plane separate from the plane of the tab 12. The plane for the pad 15 may be parallel or otherwise relative to the plane of the tab 12, and the barrel 14 need not be normal to the plane of the tab 12. The tab 12 includes a pair of spaced lips 16 which form a base for the grommet 10, and which are joined together by the sleeve portion 18 (FIGS. 3, 5, 6) which straddles a cavity 20 defined thereby and the lips 16. The spacing of the lips 16 provide an opening to the exterior of the grommet for the cavity 20 whereby a cable 22 may be introduced into the cavernous tab 12.

Figure 4:
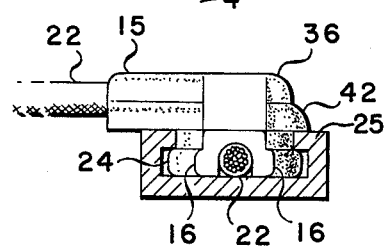
FIG. 4 is a view taken on line 4—4 of FIG. 3.

The hollow circular portion or barrel 14 is integrally formed upon one end of the tab 12 and includes an endless or annular ring 24 which is formed as a continuation of the lips 16. The width of the ring 24 is greater than the maximum distance between the spaced lips 16, as shown in FIG. 4, and is preferably co-extensive with the width of the channel formed within its member 25 in order to constitute a dam whereby corrosion from liquids, foods, etc., may be localized or prevented from further extending along the channel member 25.

A circular neck 26 is mounted on the ring 24 and has a diametrical dimension which cooperates with opposing jaws 28 formed in the topside 30 of the channel member 25 between circular reliefs or cut-outs 34 also formed in the topside 30. The formation of the barrel 14 continues upwardly to include a head 36 (FIG. 4) mounted on the neck 26, the head 36 emerging into or coupled to a bored flange member or pad 15 extending away from the head 36 while defining a bore 40 having its axis angularly oriented with respect to the axis for the cavernous tab 12. Although the planes of the pad 15 and the tab 12 are shown in the drawing to be parallel, it should be understood that such planes, and thus the pad 15 and the tab 12, are not limited to a parallel relationship. Nor is the barrel 14 limited to the configuration of a generally right cylinder. A shoulder 42 is provided about the head 36 to overhang the neck 26, and it extends along the pad 15 to its end. The bore 40 is disposed in pad 15 in such a manner as to provide a sufficient quantity of the material composing the grommet 10 to form a saddle 44 (FIGS. 5, 1) of a protective width which is retained under an inserted cable 22 extending through the bore 40. The saddle 44 measures at least across the diameter of the bore 40.

Figure 1:
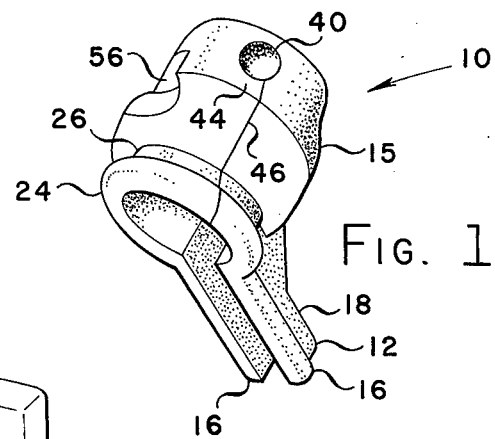
FIG. 1 is a perspective view of a grommet embodying the invention.
Figure 2:
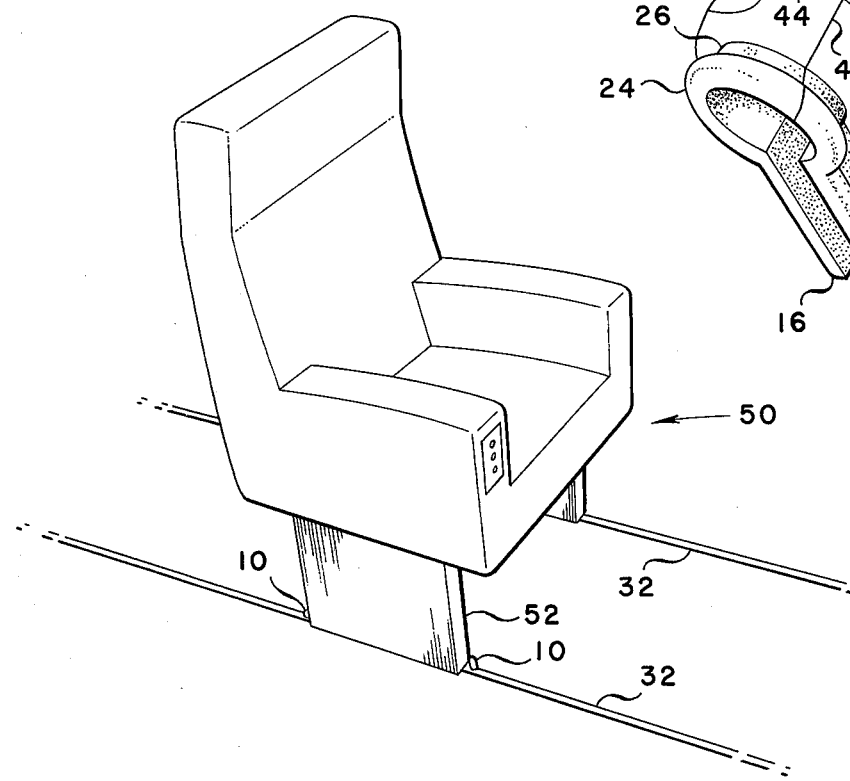
FIG. 2 is a perspective view of an environment in which the grommet embodying the invention finds utility.

A slit or cut 46 is provided in the thickness of the material forming the entire length of the barrel 14, extending upwardly from the ring 24, through the length of the pad 15 and to the bore 40, to facilitate mounting of the grommet 10 to the cable 22. The slit 46 meets and extends along the length of the pad 15 and to join with the bore 40; however, the juncture of bore and slit is offset to the diameter of the bore which lies in a vertical plane containing the axis for the barrel 14, in order that the saddle 44 provides a firm or solid footing for the cable 22 in the bore. Otherwise, pressure on the head 36 or pad 15 could possibly forcibly wedge the cable down into the slit 46 itself. FIG. 1 clearly illustrates the position for the slit 46 relative to the bore 40.

Figure 3:
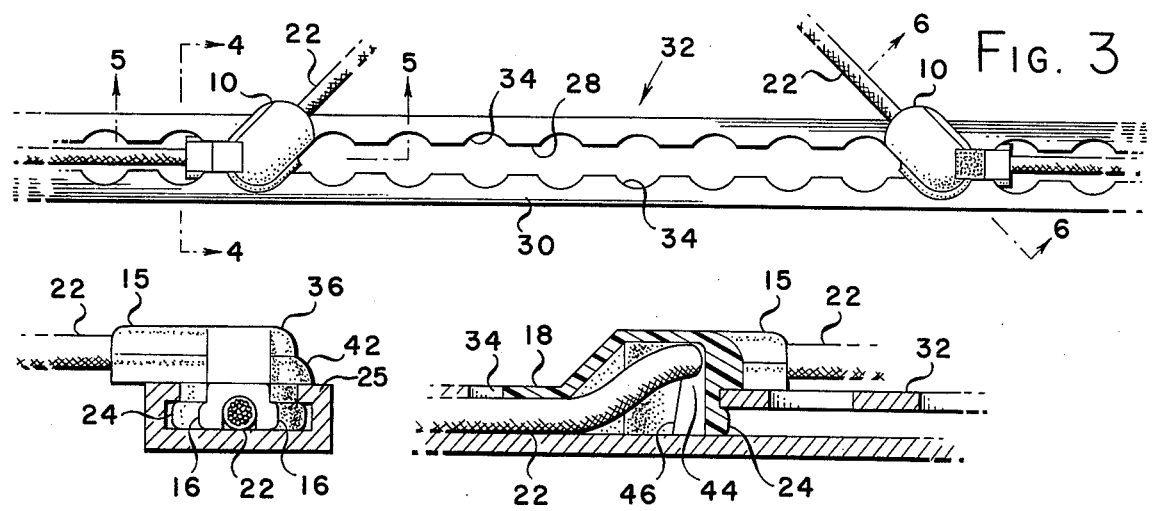
FIG. 3 is a plan view of a seat track in which grommets embodying the invention are retained, and showing directional routing of a cable therethrough.

In utilizing the grommet 10, a cable 22, such as a "multiplex" carrying a number of small wires (FIG. 4) has been laid in and along the channel member 25 secured to and extending along the floor of an aircraft cabin (FIG. 3). The cable 22 emerges from under a carpet or floor to extend up into the area of a seat assembly 50 so that additional wiring may take off from the multiplex cable to be run to a junction box or the like, mounted in or under the seat and which contains electronic devices which operate passenger conveniences. The cable 22 is thence returned to the channel member 32 for advancement to the next seat assembly in front or back of the seat assembly 50. In this particular application for the grommet 10, a pair thereof are utilized, as illustrated in FIG. 3, as the cable 22 must be returned to the channel member 25 for the further advancement thereof. Left-hand and right-hand type grommets are utilized in each pair.

The cable 22 is introduced to the grommet 10 by means of the slit 46 and the spacing of the lips 16, the cable 22 being simply thrust into the cavity 20, the barrel 14 and the bore 40 of the pad 15. This application, of course, occurs in the proximity of the points of emergence for the cable 22 from and the return thereof to the floor and channel member 25, and adjacent the seat assembly 50. Thereafter, the exact positioning for each grommet 10 is determined at the front and rear points at the base of a vertical standard 52 for the seat assembly 50. The lips 16 of each grommet 10 are inserted into a circular relief 34 provided in the topside 30 of the channel member 25 and thereafter slid under the jaws 28 formed in the topside 30 between each circular relief 34. The ring 24 is snapped into the channel member, to be retained under the topside 30 forming the circular relief 34 in view of the flexible nature of the grommet. The grommet's shoulder 42 is thus supported by the margins forming the circular relief 34 as well as the topside 30 along which the shoulder 42 and its pad 15 extends, and stabilizes the grommet against tilting or rolling under traffic or other bearing pressures. A cut-out 56 (FIGS. 1, 3) may be provided in the pad 15 to accommodate a seat assembly attachment flange (not shown) which seats on the channel member 30 immediately adjacent to the applied grommet 10.

The advantages of this grommet 10 are thus now apparent. The cable 22 extends out of the channel member 30 in a protective manner and is routed in another direction as shown in FIG. 3. As indicated above, such direction need not be necessarily limited to a plane parallel to the plane of the tab 12. The cable's position is stabilized along the length of the channel member 25 from grommet-to-grommet, from seat assembly-to-seat assembly. It keeps the cable from being inadvertently pulled out of its channel member. The tab 12 provides an anti-rotational feature to the grommet whereby a positive positioning of a cable at an angle as it extends from the grommet is achieved.

Pursuant to the requirements of the patent statutes, the principle of this invention has been explained and exemplified in a manner so that it can be readily practiced by those skilled in the art to which it pertains, or with which it is most nearly connected, such exemplification including what is presently considered to represent the best embodiment of the invention. However, it should be clearly understood that the above description and illustrations are not intended to unduly limit the scope of the appended claims, but that therefrom the invention may be practiced otherwise than as specifically described and exemplified herein, by those skilled in the art, and having the benefit of this disclosure.

Therefore, what I claim as patentably novel is:
1. A flexible grommet comprising:
    a hollow barrel having a circumferential annular retaining ring extending outwardly from its base;
    a cavernous tab extending outwardly in a first direction from the juncture of said barrel and said ring, and having spaced lips merging into said ring;
    a head formed on said barrel;
    a pad extending from said head and angularly oriented in a second direction with respect to said tab, said pad having a bore extending therethrough into said hollow barrel, the plane of extension of said pad being parallel to the plane of extension of said tab; and,
    means defining a slit extending through the walls of said barrel and said pad from the interior of said bore to the outer surface of said ring whereby a cable may be introduced through said slit so as to lie within a contiguous passage defined by said bore, said hollow barrel, and said cavernous tab.
2. The grommet of claim 1 wherein said hollow barrel is oriented normal to said tab.

* * * * *